3,803,171
5-PHENYLACETYL-PYRROLES

John Robert Carson, Norristown, Pa., assignor to McNeil Laboratories, Inc.
No Drawing. Filed Jan. 21, 1972, Ser. No. 219,864
Int. Cl. C07d 27/26
U.S. Cl. 260—326.47
7 Claims

ABSTRACT OF THE DISCLOSURE

Compounds of the class of 5-phenylacetyl-pyrrole-2-acetic acids and esters having anti-inflammatory activity and the corresponding nitrile precursors thereof.

---

The invention pertains to the field of 5-acyl-pyrrole-2-acetic acids and esters which demonstrate anti-inflammatory activity. The subject pyrroles differ from those of the prior art (see Belgian Pat. No. 762,060) by having a phenylacetyl substituent rather than a benzoyl substituent in the 5-position.

DESCRIPTION OF THE PREFERRED EMBODIMENTS

The novel 5-phenylacetyl-pyrroles of this invention having anti-inflammatory activity may be structurally represented by the formula:

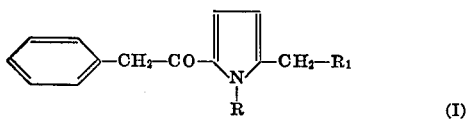

(I)

wherein R is a member selected from the group consisting of hydrogen and loweralkyl, preferably methyl; and $R_1$ is a member selected from the group consisting of COOH and COO(loweralkyl).

As used herein, "loweralkyl" may be straight or branch chained and have from 1 to 5 carbon atoms, such as, for example, methyl, ethyl, propyl, isopropyl, butyl, pentyl and the like.

The compounds of Formula I, wherein R is COOH, may be prepared by a Friedel-Crafts reaction between phenylacetyl chloride (II) and an appropriate pyrrole-2-acetonitrile of Formula III in the presence of a Lewis acid, preferably a metallic halide such as aluminum chloride, stannic chloride and the like, in a suitable solvent such as is typically employed in a Friedel-Crafts reaction, for example, methylene chloride, 1,2-dichloroethane, carbon disulfide, nitrobenzene and the like, followed by conversion of the thus-obtained 5-phenylacetyl-pyrrole-2-acetonitrile (IV) to the corresponding free carboxylic acid form by conventional nitrile-to-acid hydrolysis, for example, by heating with alkanolic alkali. The resultant acids are readily converted into the corresponding loweralkyl esters by standard esterification with an appropriate lower alkanol. The foregoing reactions may be illustrated by the following schematic diagram:

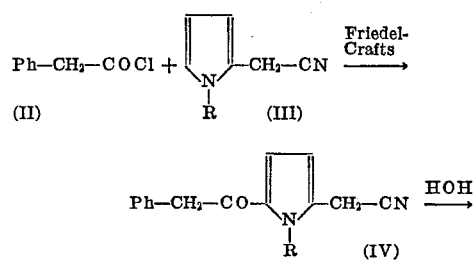

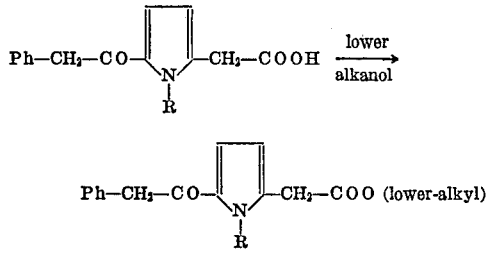

The nitriles of Formula IV are also deemed to be novel and, in view of their utility as precursors for preparing the compounds of Formula I, they constitute an additional feature of this invention.

The acids and esters of Formula I possess anti-inflammatory activity as demonstrated in the standard kaolin-induced rat paw edema assay (described in Belgian Pat. No. 762,060) at doses ranging from about 5 to about 250 mg./kg. body weight. For example, with 1-methyl-5-phenylacetylpyrrole-2-acetic acid, the most preferred species, an inhibition of 47% is observed in this assay at a dosage of 100 mg./kg. body weight.

The following examples are intended to illustrate, but not to limit, the scope of the present invention.

EXAMPLE I 1-methyl-5-phenylacetylpyrrole-2-acetic acid Phenyl-acetyl chloride (40.2 g., 0.26 mole) is added to a cooled suspension of 34.5 g. of aluminum chloride (0.26 mole) in 650 ml. of 1,2-dichloroethane. The mixture is added over 20 min. to a solution of 31.8 g. (0.26 mole) of N-methylpyrrole-2-acetonitrile in 130 ml. of 1,2-dichloroethane. The resultant mixture is stirred for 40 min. and heated to reflux for 3 min. It is then cooled and poured into ice-hydrochloric acid. The organic layer is separated and the aqueous layer washed with 1,2-dichloroethane. The combined organics are washed with water and then shaken with aqueous N,N-dimethylaminopropylamine solution. The organic fraction is separated and washed successively with dilute HCl and saturated brine and then dried over anhydrous $MgSO_4$. The solvent is evaporated in vacuo and the residual oil (about 38 g.) is chromatographed on 1100 g. of acid-washed alumina. The column is eluted successively with step wise gradient mixtures of hexane, benzene, and benzene-ether. The desired product is found in the first eluant fractions demonstrating U.V.-absorbency and is obtained optimally with a 50–50 mixture of benzene-ether eluant. The combined product bearing fractions are evaporated to give 11 g. of a yellow oil which crystallizes upon standing. Recrystallization from 2-propanol and then ethyl acetate-cyclohexane yields about 3.5 g. of the product, 1-methyl-5-phenylacetylpyrrole-2-acetonitrile, M.P. 72–74° C.

3.4 grams of the aforementioned nitrile (0.143 mole) is refluxed with 28.6 ml. of 1 N sodium hydroxide and 30 ml. of ethanol overnight (about 15 hours). The solvent is evaporated in vacuo and the residue dissolved in water and filtered. The filtrate is acidified with dilute HCl and the precipitated 1-methyl-5-phenylacetylpyrrole-2-acetic acid is collected and air-dried to give 3.6 g. (94%) of a tan solid. After recrystallization from methanol, the M.P. is 131–134° C.

EXAMPLE II 5-phenylacetyl-pyrrole-2-acetic acid is obtained by following the procedure of Example I except that an equivalent amount of pyrrole-2-acetonitrile is substituted for the N-methyl-pyrrole-2-acetonitrile used therein, and, furthermore, the chromatographic aspect of the procedure is performed with the following successive eluants in stepwise gradient mixtures: hexane, benzene, ether, chloroform and ethyl acetate, the desired 5-phenylacetyl-pyrrole-2-acetonitrile precursor being contained in the first eluant fractions demonstrating U.V.-absorbency.

EXAMPLE III

Ethyl 1-methyl-5-phenylacetylpyrrole-2-acetate: 5.0 grams of 1-methyl-5-phenylacetylpyrrole-2-acetic acid in 100 ml. of absolute ethanol containing 0.5 g. of hydrogen chloride is heated under reflux for one hour. The solvent is evaporated in vacuo to yield the ethyl ester product.

EXAMPLE IV

Propyl 5-phenylacetylpyrrole-2-acetate: By repeating the procedure of Example III except that 100 ml. of n-propanol is used in place of ethanol as the esterifying alkanol, the corresponding propyl ester product is obtained.

I claim:
1. A 5-phenylacetyl-pyrrole of the formula:

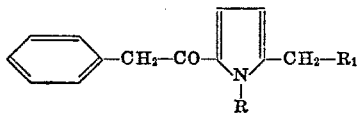

wherein R is a member selected from the group consisting of hydrogen and methyl; and $R_1$ is a member selected from the group consisting of COOH and COO(loweralkyl).

2. 1-methyl-5-phenylacetylpyrrole-2-acetic acid.
3. Loweralkyl 1-methyl-5-phenylacetylpyrrole-2-acetate.
4. Ethyl 1-methyl-5-phenylacetylpyrrole-2-acetate.
5. Propyl 5-phenylacetylpyrrole-2-acetate.
6. A 5-phenylacetyl-pyrrole-2-acetonitrile of the formula:

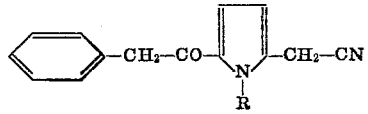

wherein R is a member selected from the group consisting of hydrogen and methyl.
7. 1-methyl-5-phenylacetylpyrrole-2-acetonitrile.

References Cited

Carson: Chem. Abs. vol. 72: 100498y (1970), abs. of French Pat. No. 1574570, July 11, 1969.
Carson et al.: Chem. Abs. vol. 75: 76501h (1971), abs. of L. Med. Chem. 1971, 646–7, (1971).

JOSEPH A. NARCAVAGE, Primary Examiner

U.S. Cl. X.R.
260—326.5 J, 999